US006536516B2

(12) United States Patent
Davies et al.

(10) Patent No.: US 6,536,516 B2
(45) Date of Patent: Mar. 25, 2003

(54) FINNED PLATE HEAT EXCHANGER

(75) Inventors: Michael E. Davies, Stoney Creek (CA); Kenneth M. A. Abels, Oakville (CA); Johny G. Burgers, Niederhausen/OberJosbach (DE); Sebastien R. Gauguier, Toronto (CA)

(73) Assignee: Long Manufacturing Ltd., Oakville (CA)

( * ) Notice: Subject to any disclaimer, the term of this patent is extended or adjusted under 35 U.S.C. 154(b) by 47 days.

(21) Appl. No.: 09/909,536

(22) Filed: Jul. 20, 2001

(65) Prior Publication Data

US 2002/0079095 A1 Jun. 27, 2002

(30) Foreign Application Priority Data

Dec. 21, 2000 (CA) .............................................. 2329408

(51) Int. Cl.[7] ................................................. F28F 3/14
(52) U.S. Cl. ...................................... 165/170; 165/80.4
(58) Field of Search ............................... 165/80.4, 80.5, 165/170, 185, 916, 166, 104.33; 361/699, 677; 174/15.1

(56) References Cited

U.S. PATENT DOCUMENTS

| 2,039,593 | A | | 5/1936 | Hubbuch et al. | |
|---|---|---|---|---|---|
| 4,574,876 | A | | 3/1986 | Aid | |
| 5,028,989 | A | * | 7/1991 | Naganuma et al. | 165/104.33 |
| 5,099,311 | A | * | 3/1992 | Bonde et al. | 165/80.4 |
| 5,159,529 | A | * | 10/1992 | Lovgren et al. | 165/80.4 |
| 5,205,348 | A | | 4/1993 | Tousignant et al. | |
| 5,285,347 | A | * | 2/1994 | Fox et al. | 165/80.4 |
| 5,316,077 | A | * | 5/1994 | Reichard | 361/699 |
| 5,381,510 | A | | 1/1995 | Ford et al. | |
| 5,423,376 | A | * | 6/1995 | Julien et al. | 165/80.4 |
| 5,495,889 | A | * | 3/1996 | Dubelloy | 165/104.33 |
| 5,829,517 | A | | 11/1998 | Schmid et al. | |
| 5,901,037 | A | * | 5/1999 | Hamilton et al. | 361/699 |

FOREIGN PATENT DOCUMENTS

| DE | 0 807 756 B1 | 3/1997 |
|---|---|---|
| DE | 29722841 U | 2/1998 |
| EP | 0826874 | 3/1998 |
| EP | 0 890 810 A2 | 1/1999 |
| FR | 2748800 | 11/1997 |
| FR | 2774463 | 1/1998 |
| FR | 2774635 | 2/1998 |
| FR | 2785377 | 10/1998 |
| FR | 2774462 A | 8/1999 |
| WO | PCT/AU94/00153 | 10/1994 |

* cited by examiner

Primary Examiner—Henry Bennett
Assistant Examiner—Terrell Mckinnon
(74) Attorney, Agent, or Firm—Ridout & Maybee LLP

(57) ABSTRACT

A heat exchanger includes an extruded base member having a planar central portion and spaced-apart cooling fins extending from one side of the planar central portion. A cross-over member is located on the other side of the planar central portion and includes a plurality of spaced-apart flow channels that communicate with inlet and outlet manifolds formed in the base member or the cross-over member, or partially in both the base member and the cross-over member.

20 Claims, 7 Drawing Sheets

FINNED PLATE HEAT EXCHANGER

This application claims priority to Canadian Application No. 2,329,408 filed Dec. 21, 2000.

BACKGROUND OF THE INVENTION

The present invention relates to heat exchangers, and in particular, to heat exchangers useful as fuel coolers for automotive engines.

In recent years, it has become desirable, if not necessary, to cool the fuel used by the engines of motor vehicles especially diesel engine powered vehicles. The most convenient way to do this is to insert a heat exchanger in series in a fuel line running between the engine and the fuel tank of the motor vehicle. Further, in order to keep the installation of these heat exchangers as simple and inexpensive as possible, air cooled heat exchangers are sometimes chosen in order to eliminate the need for coolant lines to be run to the heat exchanger.

Since the fuel lines usually run along the underside or underbody of the motor vehicle, it has been found to be convenient to mount the fuel coolers on the underbody of the vehicle. A difficulty with this, however, is that the heat exchangers are exposed to the elements and thus subject to damage. In northern climates, ice and snow can also cause a problem with the efficiency of the heat exchangers. Another concern is that the heat exchangers must be low in height or have a low profile in order to provide sufficient clearance between the underbody of the vehicle and the road surface.

One attempt to meet the desired design criteria and overcome the above-mentioned difficulties is shown in European patent application No. EP 0 890 810 published on Jan. 13, 1999. This patent shows a fuel cooler that has an extruded or continuously cast main body containing a plurality of longitudinal internal flow channels. This main body has open ends. Another member with cooling ribs or fins is attached to the main body. Finally, end pieces or closing elements are used to close off the open ends of the main body and make the fuel flow in series through the fluid channels in the main body. This heat exchanger is difficult and expensive to manufacture, however, because of the number and complexity of the individual components and the need for a special tooling to make these components.

In the present invention, heat exchangers are provided that are much simpler and easier to manufacture, and which require much less expensive tooling to make the required components.

SUMMARY OF THE INVENTION

According to one aspect of the invention, there is provided a heat exchanger comprising an elongate base member including a planar central portion having first and second side surfaces and a plurality of spaced-apart fins extending from one of the first and second side surfaces. A cross-over member is connected to the other of the first and second side surfaces and defines spaced-apart flow channels for the flow of a heat exchange fluid over the planar central portion. The flow channels have opposed inlet and outlet end portions. One of the cross-over member and the base member is formed with spaced-part, inlet and outlet manifolds communicating respectively with the inlet and outlet end portions. Also, inlet and outlet fittings communicate respectively with the inlet and outlet manifolds.

According to another aspect of the invention, there is provided a method of forming a heat exchanger comprising the steps of extruding a base member having a planar central portion and spaced-apart fins extending from one side of the planar central portion. A cross-over member is formed having a plurality of spaced-apart transverse flow channels therein. A pair of spaced-apart flow manifolds is formed in one of the base member and the cross-over member. Also, the cross-over member is attached to the planar central portion, so that the flow manifolds and flow channels communicate with each other and the planar central portion.

According to yet another aspect of the invention, there is provided a method of forming a heat exchanger comprising the steps of extruding a base member having a planar central portion and spaced-apart fins extending from one side of the planar central portion. The base member also has a pair of spaced-apart inlet and outlet manifolds extending transversely from the planar central portion in the same direction as the fins. A cross-over member is formed having a plurality of spaced-apart flow channels formed therein. The flow channels have opposed inlet and outlet end portions. Also, the cross-over member is attached to the planar central portion, so that the opposed inlet and outlet end portions communicate with the respective inlet and outlet flow manifolds.

BRIEF DESCRIPTION OF THE DRAWINGS

Preferred embodiments of the invention, will now be described, by way of example, with reference to the accompanying drawings, in which.

DESCRIPTION OF THE PREFERRED EMBODIMENTS

Figure 1:
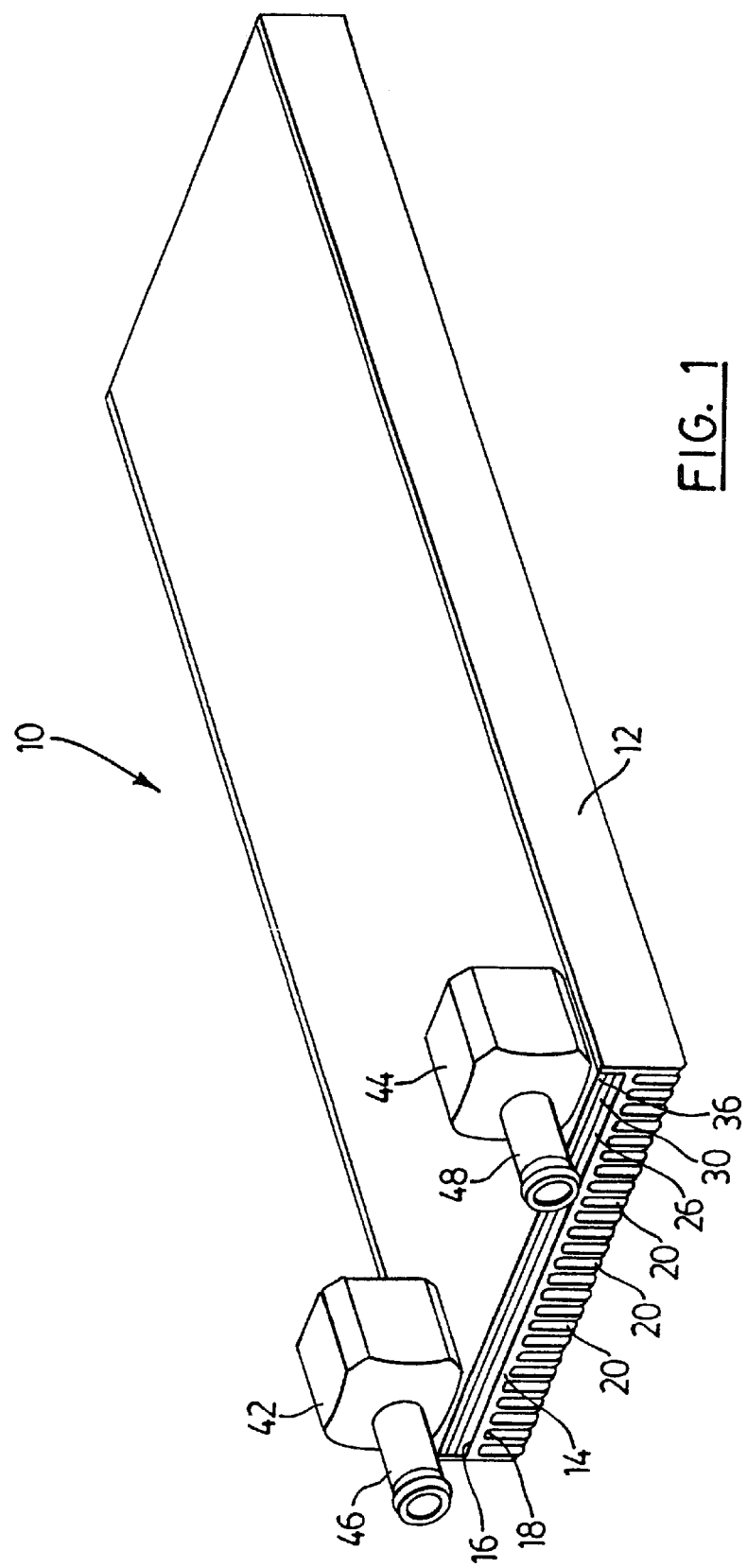
FIG. 1 is a perspective view of one preferred embodiment of a heat exchanger according to the present invention.
Figure 2:
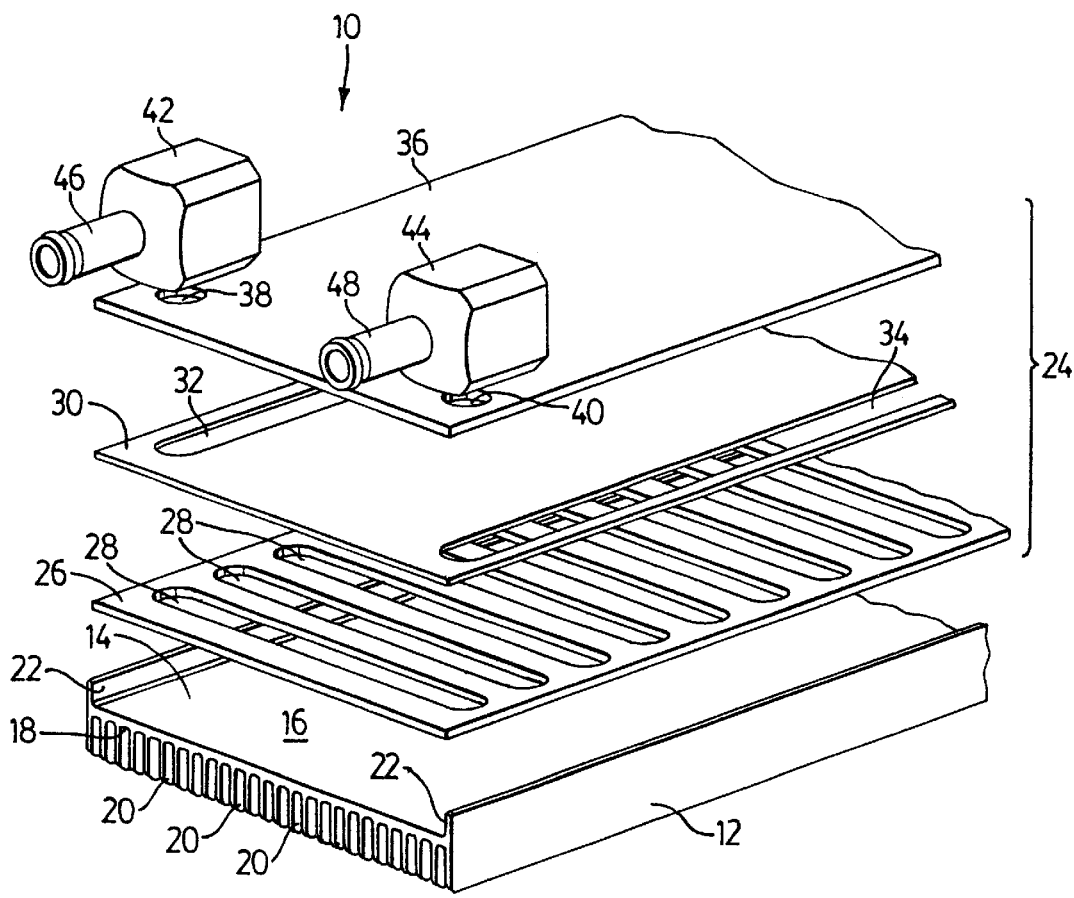
FIG. 2 is an enlarged, exploded, perspective view of the left end of the heat exchanger as seen in FIG. 1.

Referring firstly to FIGS. 1 and 2, a preferred embodiment of a heat exchanger according to the present invention is generally indicated by reference numeral 10. Heat exchanger 10 is particularly useful as a fuel cooler and as such is an air cooled or liquid to air heat exchanger. It will be appreciated, however, that heat exchanger 10 can also be used to heat fluids, and it can also be used with fluids other than air and fuel.

Heat exchanger 10 includes an elongate base member 12 which includes a planar central portion. 14. Planar central portion 14 has an upper or first side surface 16 and a lower or second side surface 18. A plurality of spaced-apart fins 20 extend from the planar central portion 14. In the embodiment shown in FIGS. 1 and 2, fins 20 extend downwardly from the second side surface 18 but, as will be apparent from the following discussion, the fins 20 could extend upwardly or downwardly from planar central portion 14, as desired. The length, direction or orientation, and the spacing of fins 20 can be chosen to give predetermined or desired heat transfer characteristics to heat exchanger 10.

Base member 12 also has upwardly extending peripheral side skirts 22 (see FIG. 2) to help position the main components of heat exchanger 10, but side skirts 22 are not necessary and can be eliminated, if desired.

Heat exchanger 10 also includes a cross-over member 24 which is connected to the other of the first and second side surfaces 16, 18, namely, to first side surface 16 as shown in FIGS. 1 and 2. Cross-over member 24 includes a first plate 26 located adjacent to the base member planar central portion 14. First plate 26 includes or defines a plurality of spaced-apart slots 28 therein which form spaced-apart flow channels for the flow of a heat exchange fluid, such as fuel, over the planar central portion 14. First plate 26 preferably is stamped to form slots 28. Slots 28 preferably are as long as possible and spaced as closely together as possible, yet keeping first plate 26 reasonably flat for assembly purposes, also to be described further below. If desired, slots 28 can be of different widths to vary the flow distribution across planar central portion 14. Also, expanded metal turbulizers could be located in slots 28, if desired.

Cross-over member 24 also includes a second plate 30 which overlies first plate 26. Second plate 30 has a pair of spaced-apart slots 32, 34 formed therein which become flow manifolds for the supply and return of fuel from slots or flow channels 28. It will be appreciated that the flow manifolds 32, 34 communicate with the opposed distal end portions of flow channels 28, one of the end portions being an inlet end portion and the other of the end portions being an outlet end portion, depending upon which direction the fluid is flowing through heat exchanger 10. Similarly, either of the flow manifolds 32 or 34 could be the inlet manifold, the other one being the outlet manifold, depending upon the direction in which the fluid flows through heat exchanger 10. Also, flow manifolds or slots 32, 34 could be tapered if desired to help distribute the flow longitudinally along the heat exchanger.

It will be appreciated that plates 26 and 30 could be reversed, so that plate 30 is the first plate and is located adjacent to the planar central portion 14, and plate 26 is the second plate and is located on top of plate 30.

Cross-over member 24 also includes a third or cover plate 36 which overlies the second or manifold plate 30. Third or cover plate 36 has inlet and outlet openings 38, 40 formed therein that communicate with the respective slots or flow manifolds 32, 34 in second plate 30. Again, the direction of flow of fluid or fuel through heat exchanger 10 determines which of the openings 38, 40 is the inlet and which is the outlet.

Finally, inlet and outlet elbows or fittings 42, 44 are attached to third or cover plate 36. Fittings 42, 44 have barbs or nipples 46, 48 for attaching hoses, such as fuel lines, to heat exchanger 10. Nipples 46, 48 thus communicate with inlet and outlet manifolds 32, 34 and thus in turn with flow channels 28.

Base member 12 is preferably formed of aluminum or an aluminum alloy and is most conveniently made by extrusion, so that it can be made to any desired length simply by chopping or sawing the extrusion to a desired length. Plates 26, 30 and 36 are preferably stamped out of brazing clad aluminum. Fittings 42, 44 also are made of aluminum or an aluminum alloy. Heat exchanger 10 is made by assembling the components and furnace brazing or soldering them together.

Figure 3:
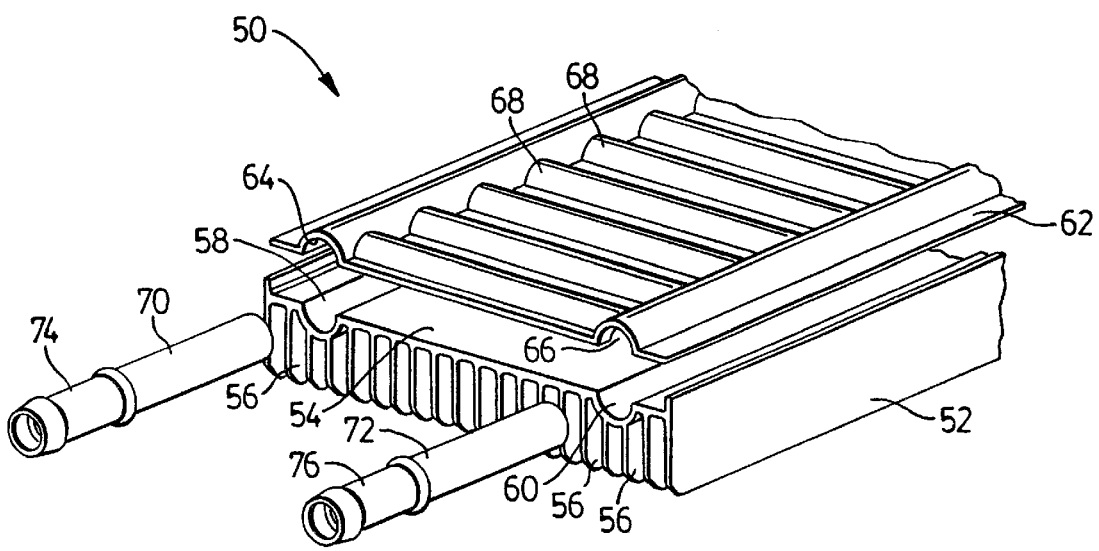
FIG. 3 is an exploded perspective view, similar to FIG. 2, but showing another preferred embodiment of the present invention.

Referring next to FIG. 3, another preferred embodiment of a heat exchanger according to the present invention is generally indicated by reference numeral 50. Heat exchanger 50 also has an extruded aluminum base member 52 with a planar central portion 54 and spaced-apart fins 56, all of those components being similar to the embodiment of FIGS. 1 and 2. However, base member 52 is also formed with spaced-apart longitudinal grooves 58, 60 in planar central portion 54. These grooves 58, 60 extend from planar central portion 54 in the same direction as fins 56 and form partial inlet and outlet manifolds. These inlet and outlet manifolds are completed by cross-over member 62, as described next below.

Cross-over member 62 is formed with a pair of longitudinal, spaced-apart, inverted, U-shaped grooves 64, 66 that also form partial inlet and outlet manifolds. Grooves 64, 66 co-operate with respective base member grooves 58, 60 to form the full inlet and outlet manifolds for heat exchanger 50. Cross-over member 62 is also formed with transverse, spaced-apart, inverted grooves or flow channels 68 (that appear as ribs in FIG. 3), that communicate between the longitudinal grooves or flow manifolds 64, 66. Flow channels 68 are shown to be perpendicular to manifolds 64, 66, but they could be angled as well, if desired. Cross-over member 62 normally is roll formed, but it could be stamped if desired, in which case flow channels 68 could be of different widths or heights to vary the flow distribution inside heat exchanger 50.

The cross-over member inlet and outlet manifolds 64, 66 overlie and communicate with the respective base member manifolds 58, 60 to form enlarged inlet and outlet manifolds for heat exchanger 50. Tubular fittings 70, 72 are then inserted into these flow manifolds. Fittings 70 and 72 have integral hose barbs or nipples 74, 76 for the attachment of hoses, such as fuel lines, to heat exchanger 50. At the opposite end of heat exchanger 50, suitable plugs (not shown) would be inserted into the manifolds formed by grooves 58, 64 and 60, 66. If desired, fittings 70, 72 could be located at opposite ends of heat exchanger 80, one fitting being associated with each of the manifolds 64, 66, and either one being the inlet fitting, the other one being the outlet fitting. The opposite ends of the manifolds 58, 64 and 60, 66 would be plugged.

In heat exchanger 50, the inlet and outlet manifolds are partially formed in both the base member 52 and the cross-over member 62, but they could be formed only in the cross-over member 62. In this case, the planar central portion 54 would be flat and continuous as in the embodiment of FIGS. 1 and 2. Suitable modifications would be made to the shape of fittings 70, 72 to fit in a fluid tight manner into the inlet and outlet manifolds 64, 66. In heat exchanger 50, the partial inlet and outlet manifolds 58, 60 in base member 52 underlie and communicate with the respective cross-over member partial manifolds 64, 66 and together form enlarged inlet and outlet manifolds for heat exchanger 50. By the same token, the partial inlet and outlet manifolds 64, 66 in cross-over member 62 overly and communicate with the respective base member partial manifold 58, 60 to form enlarged inlet and outlet manifolds for heat exchanger 50.

Figure 4:
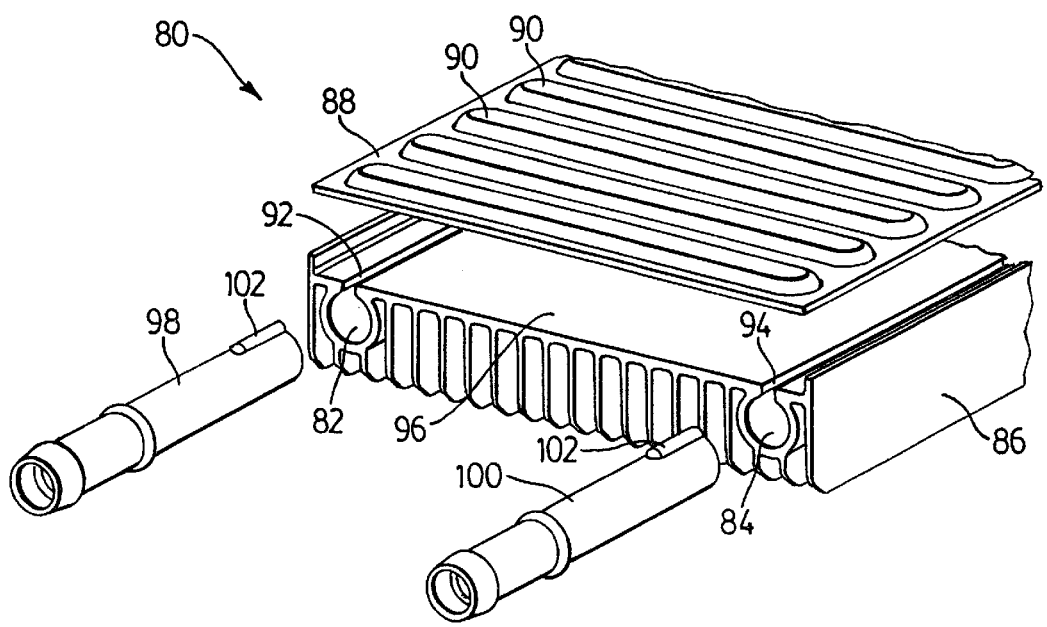
FIG. 4 is an exploded perspective view, similar to FIGS. 2 and 3, showing yet another preferred embodiment of a heat exchanger according to the present invention.

Referring next to FIG. 4, another preferred embodiment of a heat exchanger according to the present invention is generally located by reference numeral 80. Heat exchanger 80 is somewhat similar to heat exchanger 50 of FIG. 3, except that the inlet and outlet manifolds 82, 84 are completely formed in base member 86. Cross-over member 88 is simply formed with transverse, inverted grooves 90 (again appearing as ribs in FIG. 4) that define the flow channels therein. Inlet and outlet manifolds 82, 84 have upper slots 92, 94, and the grooves 90 face the planar central portion 96 and extend over the slots 92, 94 and thus between inlet and outlet manifolds 82, 84 for the flow of fluid or fuel over planar central portion 96. Grooves 90 could be of different widths along the length of heat exchanger 80. For example, the grooves 90 close to the inlet and outlet of heat exchanger 80 could be of narrower width to reduce the tendency for short circuit flow between the inlet and outlet. Another possibility would be to put expanded metal turbulizers in grooves 90, especially near the heat exchanger inlet and outlet.

If desired, slots 92, 94 could be replaced with longitudinally spacedapart, transverse holes (see, for example, FIG. 10), or a combination of holes and grooves, that communicate with manifolds 82, 84. Further, these holes could be of different sizes or spaced-apart at different intervals or locations along base member 86 to adjust the cross-flow between manifolds 82, 84 along the length of the heat exchanger. Of course, the spacing or size of flow channels 90 would be adjusted to suit these holes.

Figure 6:
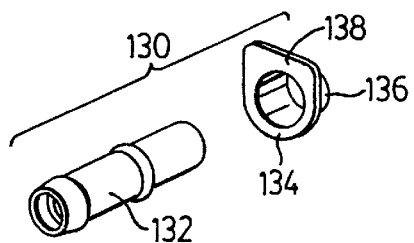
FIG. 6 is a perspective view of a fitting and shim combination for various embodiments of the present invention.

Inlet fittings 98, 100 have raised longitudinal ribs or tabs 102 that plug the ends of slots 92, 94 to make a fluid tight connection with base member 86. However, ribs 102 could be eliminated if a shim is used as indicated in FIG. 6, and as will be described further below. Also, instead of forming cross-over member 88 with grooves 90, one large groove or depression in member 88 could be used. In this case, it may be advantageous to place one or more expanded metal turbulizers in the cavity created by the one large groove 90 between plate 88 and planar central portion 96. Another possibility is to make cross-over member 88 a dimpled plate with the dimples extending downwardly to contact planar central portion 96. The density or spacing of the turbulizers or dimples could be varied to affect the cross-over flow distribution between inlet and outlet manifolds 82, 84. Otherwise, the construction of heat exchanger 80 is very similar to heat exchanger 50 of FIG. 3. Again, fittings 98, 100 could be located at opposite ends of heat exchanger 80, one fitting being located in each of the manifolds 82, 84.

Figure 5:
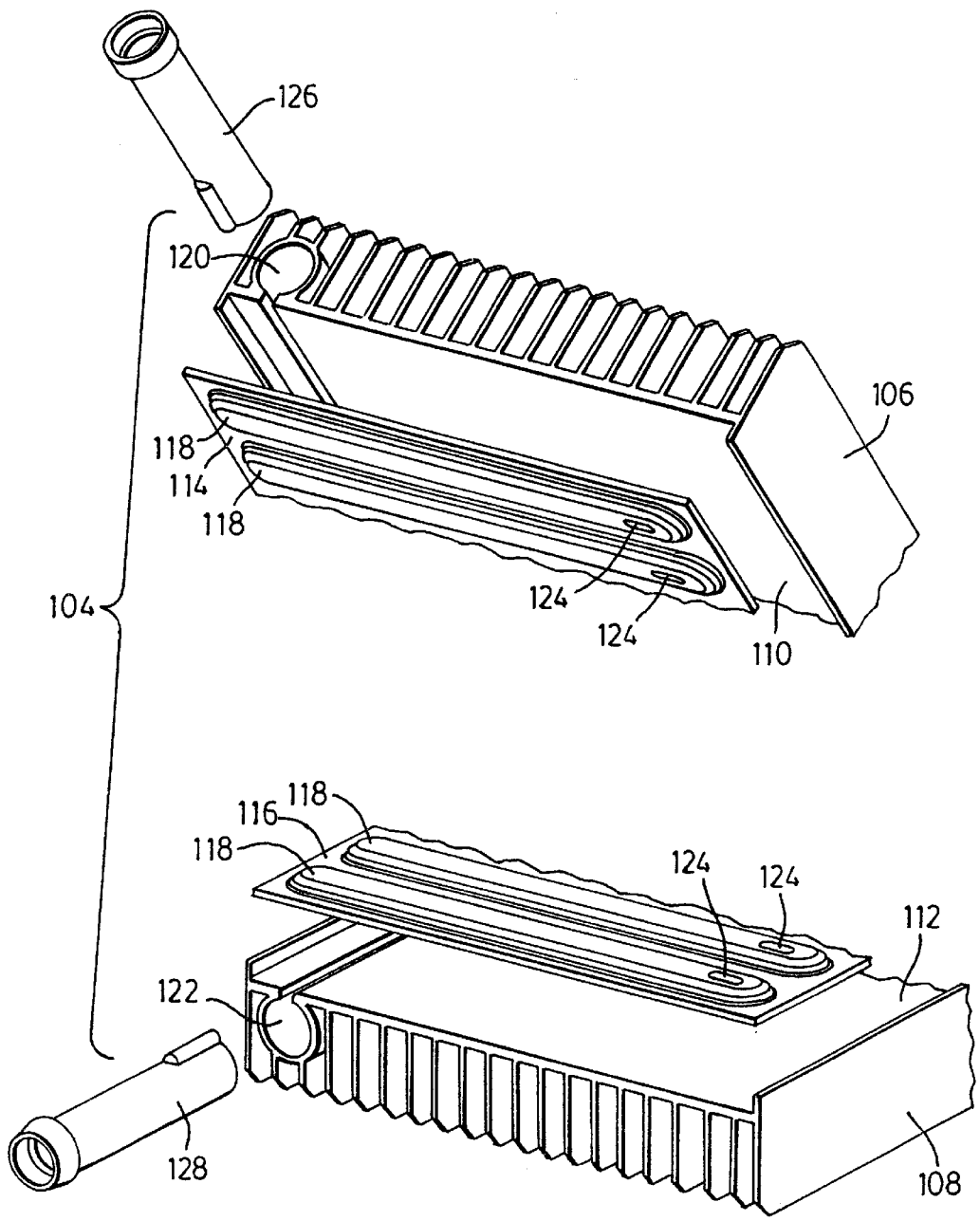
FIG. 5 is an exploded perspective view, similar to FIGS. 2 to 4, yet showing yet another preferred embodiment of a heat exchanger according to the present invention.

Referring next to FIG. 5, heat exchanger 104 is yet another preferred embodiment according to the present invention. In heat exchanger 104, the base member is formed of two-halves 106, 108 stacked on top of each other with their respective planar central portions 110, 112 adjacent to each other. Similarly, the cross-over member is formed of two halves or plates 114 and 116. Cross-over member plates 114, 116 are similar to the cross-over member 88 of FIG. 4 in that they have transverse grooves 118 (again appearing as ribs in FIG. 5) formed therein defining flow channels. The cross-over member plates 114, 116 are arranged back-to-back with their respective grooves 118 facing the planar central portions 110, 112. An inlet manifold 120, like inlet manifold 82 of the embodiment of FIG. 4, is formed in one of the base member halves 106, and an outlet manifold 122, like that of outlet manifold 84 in the embodiment of FIG. 4, is formed in the other of the base member halves 108. The grooves 118 of the cross-over members or plates 114, 116 are formed with transfer openings 124 located remote from inlet and outlet manifolds 120, 122 for passing heat exchange fluid between the back-toback plates 114, 116. Otherwise, the construction of heat exchanger 104 is similar to heat exchanger 80 of FIG. 4. Thus, fluid entering inlet manifold 120 through fitting 126 passes through flow channels 118 passing over central planar portion 110, then through openings 124 back through flow channels 118 of the lower half of heat exchanger 104, passing over central planar portion 112 and out through outlet fitting 128.

FIG. 6 shows a modified fitting combination 130 that could be used for the inlet or outlet of either of the embodiments of FIG. 4 or 5. Fitting combination 130 includes a nipple 132 much like the fittings 74, 76 of FIG. 3, and also a shim 134. Shim 134 includes a tubular portion 136 that accommodates fitting 132 and fits snugly into the end of manifolds 82 or.84. Shim 134 also optionally includes a tab portion 138 that closes off the ends of the slots 92, 94 to provide a fluid-tight connection between the fittings and manifolds 82, 84. Shim 134 preferably is made of brazing clad aluminum or brazing sheet that has a clad filler metal on both surfaces, so that the shim 134 provides a source of filler metal to provide fluid-tight joints or seals for nipple 132. Alternatively, shims 134 could be made from or covered with filler metal foil.

Figure 7:
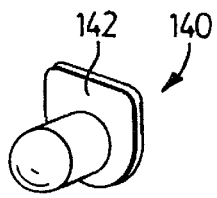
FIG. 7 is a perspective view of a manifold end plug for various embodiments of the present invention.

FIG. 7 shows a plug 140 that can bemused in any of the embodiments of FIGS. 3, 4 or 5 to close off the open ends of the inlet and outlet manifolds not containing an inlet or outlet fitting. Plug 140 also includes a tab portion 142 that closes off the ends of the slots 92, 94 to give a fluid-tight seal. Plug 140 preferably is made of brazing sheet with filler metal clad on at least the one side that contacts the inlet and outlet manifolds.

An alternative to using filler metal cladding or foil on the brazing sheet used to make shim 134 and plug 140 is the use filler metal wire preforms. Such filler metal wire preforms could also be used in place of shims 134.

Figure 8:
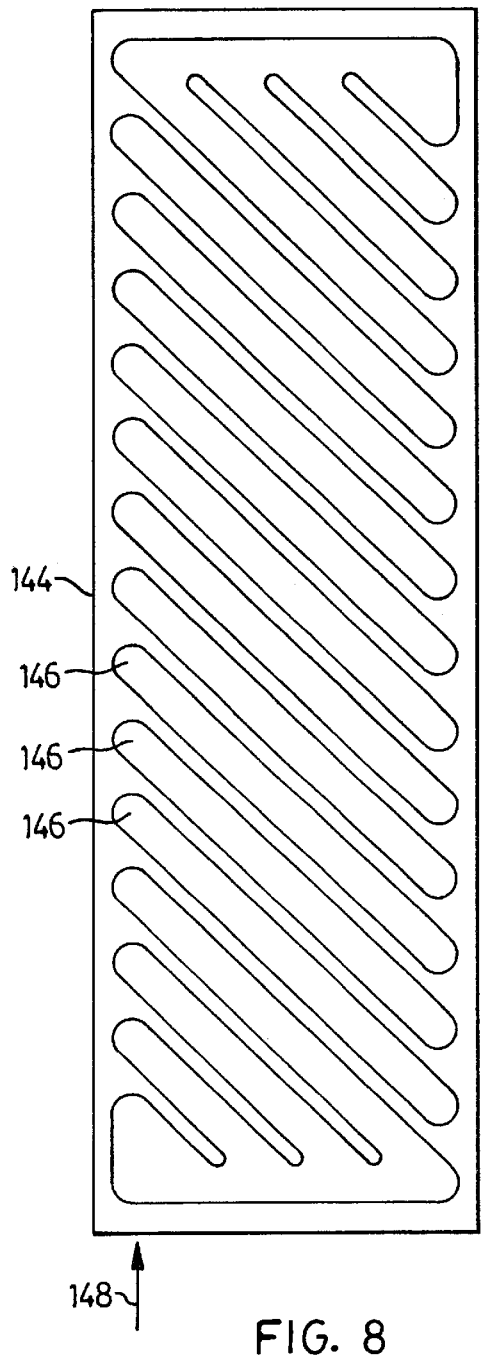
FIG. 8 is a diagrammatic view illustrating angled cross-over member flow channels as used in the present invention.

FIG. 8 shows diagrammatically another configuration of a cross-over member 144 that could be used for the various cross-over members described above. For example, cross-over member 144 could be used as the first plate 26 of the embodiment of FIGS. 1 and 2, in which case there would be flow channels 146 in the form of angled slots in plate 144. In the embodiments of FIGS. 4 and 5, flow channels 146 would be angled grooves formed in plate member 144. The inlet side of plate 144 is indicated by arrow 148.

Figure 9:
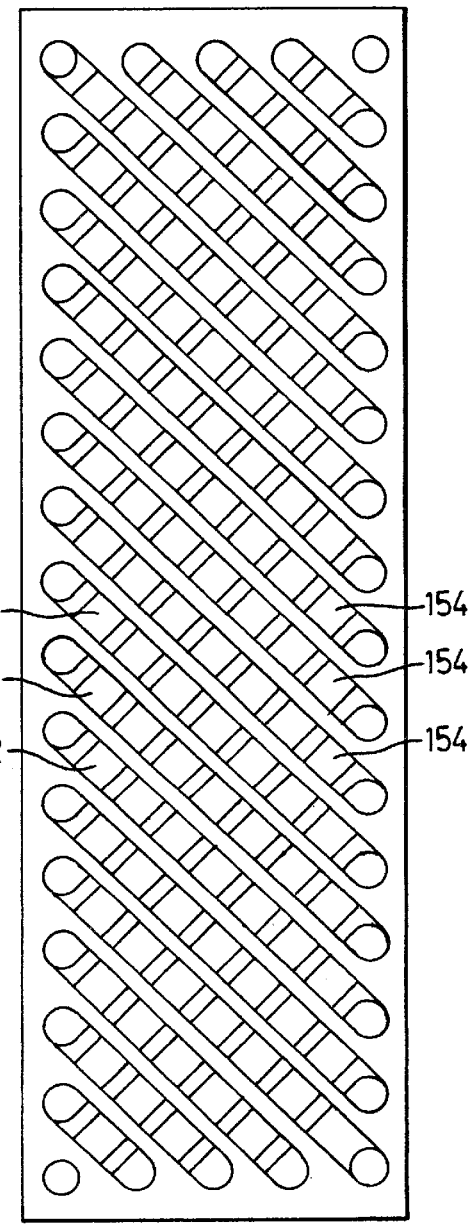
FIG. 9 is a diagrammatic view of a cross-over member having overlapping plates with angled crossing flow channels.

FIG. 9 is a diagrammatic view similar to FIG. 8, but showing a cross-over member 150 formed of two overlapping plates that have angled flow channels 152, 154 that criss-cross. If cross-over member 150 is used in the embodiment of FIGS. 1 and 2, cross-over member 150 would take the place of both plates 26 and 30. A third or cover plate 36 would still be required. Preferable the inlet and outlet openings 38, 40 would be located at opposite corners of cross-over plate 150.

If cross-over member 150 is used for the embodiment of FIGS. 4. and 5, the uppermost plate would be a solid plate formed with grooves that define flow channels 152, much like cross-over members 88, 114 and 116, except that the flow channels are on an angle. Again, the flow channels in cross-over members 144, 150 can differ in width or spacing to vary the flow distribution inside their respective heat exchangers.

Figure 10:
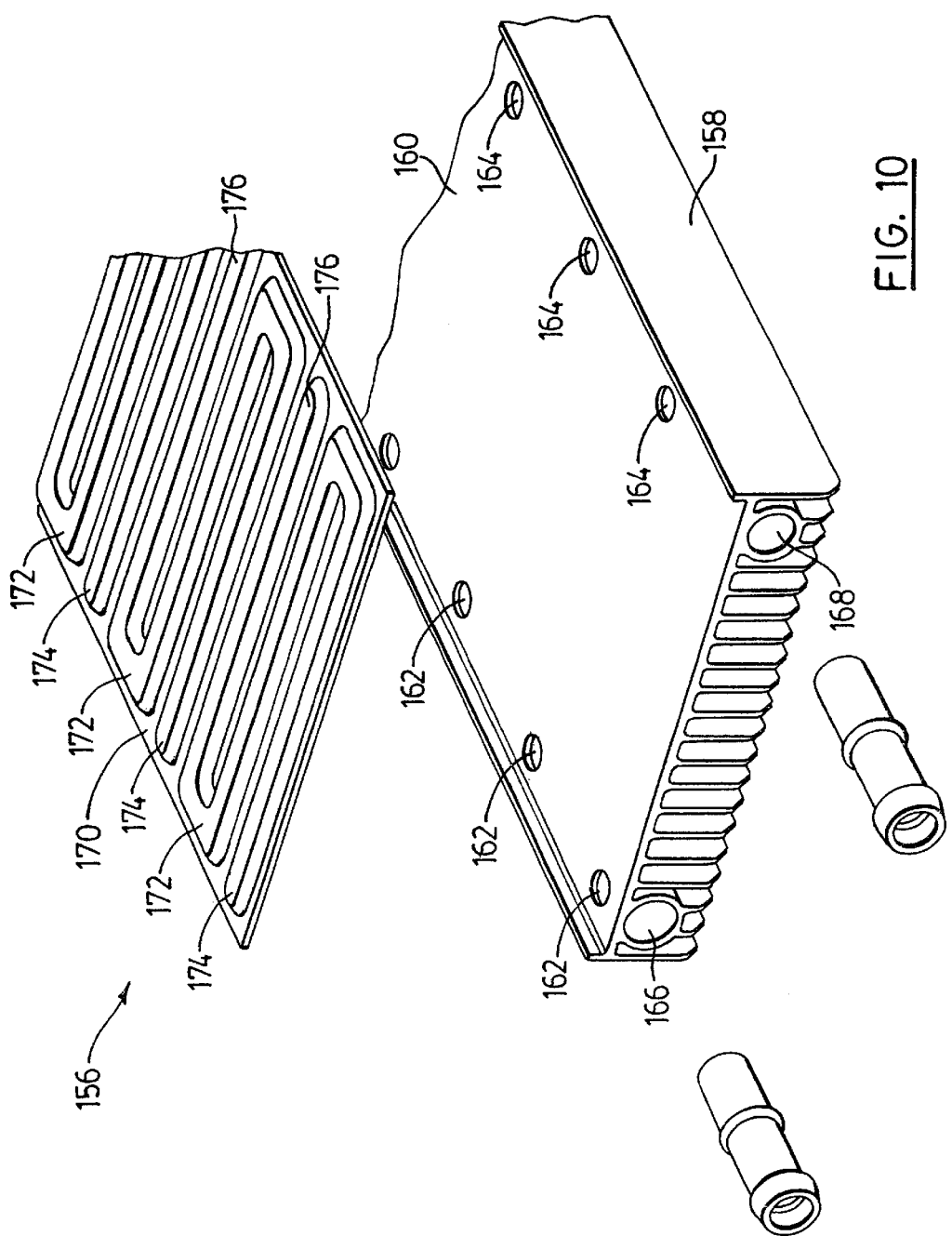
FIG. 10 is an exploded perspective view of yet another preferred embodiment of a heat exchanger according to the present invention.

Referring next to FIG. 10, another preferred embodiment of a heat exchanger according to the present invention is generally indicated by reference number 156. Heat exchanger 156 is similar to the embodiment of FIG. 4, except that base member 158 has a planar central portion 160 that includes a plurality of spaced-apart openings 162, 164 therethrough communicating with respective inlet and outlet manifolds 166, 168. Cross-over member 170 is formed with serpentine grooves or flow channels 172, each having an inlet end portion 174 and an outlet end portion 176 communicating with respective inlet and outlet openings 162, 164. Each serpentine flow channel 172 is shown having 3 passes or lengths, but there could be any odd number of passes, such as 5, 7, 9, or more passes between each of the inlet and outlet openings 162, 164. There could also be a mixture of flow channels containing different numbers of channels. Also, the widths of the flow channels could be varied as well as the diameters of the openings 162, 164 to vary the flow distribution inside heat exchanger 156.

The method of making heat exchangers 10, 50, 80, 104 and 156 starts with the step of extruding the base members so that they have planar central portions and spaced-apart fins extending from one side of the planar central portions. The cross-over members are then formed by stamping the plates as in FIG. 1 or stamping or roll forming the plates of the type shown in FIGS. 3, 4, 5 and 10. In each case, the base portions and/or the cross-over members are formed with a pair of spaced-apart flow manifolds and a plurality of spaced-apart transverse flow channels extend between the flow manifolds. The inlet and outlet fittings are then placed in position and the components are attached together. The flow manifolds and flow channels and inlet and outlet fittings thus communicate with the planar central portions to provide the heat transfer between fluid passing through the heat exchanger and the fluid, such as air, exposed to the fins of the base members.

Having described preferred embodiments of the invention, it will be appreciated that various modifications may be made to the structures described above. For example, the heat exchangers have been shown having longitudinal fins, and transverse flow channels provided by the cross-over members. This provides a cross flow type heat exchanger. However, the flow channels of the cross-over members could be orientated in the same direction as the fins, in which case, a parallel flow heat exchanger would be provided. The heat exchangers described above have been shown to be rectangular or elongate, but they could be square as well. Different types of fittings could be used for attaching the heat exchangers into the fluid circuits into which they would be used, and the fittings can be located in different positions than those described above. Of course, the dimensions of the components described above can be varied to suit the application.

As will be apparent to those skilled in the art in the light of the foregoing disclosure, many alterations and modifications are possible in the practice of this invention without departing from the spirit or scope thereof. The foregoing description is of the preferred embodiments by way of example only, and is not to limit the scope of the invention.

What is claimed is:

1. A heat exchanger comprising:
an elongate base member including a planar central portion having first and second side surfaces and a plurality of spaced-apart fins extending from one of said first and second side surfaces; a cross-over member connected to the other of said first and second side surfaces and defining spaced-apart flow channels for the flow of a heat exchange fluid over the planar central portion, the flow channels having opposed inlet and outlet end portions; one of the cross-over member and the base member being formed with spaced-apart, inlet and outlet manifolds communicating respectively with said inlet and outlet end portions; and inlet and outlet fittings communicating respectively with said inlet and outlet manifolds.

2. A heat exchanger as claimed in claim 1 wherein said inlet and outlet manifolds are formed in the cross-over member.

3. A heat exchanger as claimed in claim 1 wherein said inlet and outlet manifolds are formed in the base member.

4. A heat exchanger as claimed in claim 2 wherein the base member is also formed with inlet and outlet manifolds that underlie and communicate with the respective cross-over member manifolds to form the inlet and outlet manifolds for the heat exchanger.

5. A heat exchanger as claimed in claim 3 wherein the cross-over member is also formed with inlet and outlet manifolds that overlie and communicate with the respective base member manifolds to form the inlet and outlet manifolds for the heat exchanger.

6. A heat exchanger as claimed in claim 2 wherein the cross-over member includes a first plate located adjacent to the base member planar central portion and a second plate overlying the first plate; one of the first and second plates defining a plurality of spaced-apart slots therein forming said flow channels, and the other of the first and second plates having a pair of spaced-apart slots therein communicating respectively with the flow channel inlet and outlet openings; and the cross-over member further including a cover-plate overlying the second plate and having inlet and outlet openings formed therein located to communicate respectively with the flow channel inlet and outlet openings.

7. A heat exchanger as claimed in claim 2 wherein the cross-over member is formed with a pair of longitudinal, spaced-apart grooves forming said inlet and outlet manifolds, the cross-over member also being formed with transverse, spaced-apart grooves communicating between the longitudinal grooves and thus forming said spaced-apart flow channels.

8. A heat exchanger as claimed in claim 1 wherein the base member is an extruded member having a flat first side surface, said fins extending from the second side surface.

9. A heat exchanger as claimed in claim 3 wherein the base member is an extruded member, the inlet and outlet manifolds being longitudinal grooves formed in the planar central portion and extending in the same direction as the fins.

10. A heat exchanger as claimed in claim 9 wherein the cross-over member is a plate having transverse grooves formed therein defining said flow channels, the grooves facing the planar central portion and extending between the inlet and outlet manifolds.

11. A heat exchanger as claimed in claim 1 wherein the base member is formed of two halves stacked on top of each other with their respective planar central portions adjacent, the cross-over member being located between the planar central portions.

12. A heat exchanger as claimed in claim 11 wherein the cross-over member is formed of plates having transverse grooves formed therein defining said flow channels, the plates being arranged back-to-back with the grooves facing the planar central portions of the respective base member halves.

13. A heat exchanger as claimed in claim 12 wherein the inlet manifold is formed in one of the base member halves and the outlet manifold is formed in the other of the base member halves, the cross-over member grooves being formed with transfer openings located remote from the inlet and outlet manifolds for passing heat exchange fluid between the back-to-back plates.

14. A heat exchanger as claimed in claim 9 wherein the inlet and outlet manifolds have opposed ends, the inlet and outlet fittings being nipples mounted in one of the ends of the extruded inlet and outlet manifolds.

15. A heat exchanger as claimed in claim 14 and further comprising plugs located in the other of the ends of the inlet and outlet manifolds.

16. A heat exchanger as claimed in claim 3 wherein the base member planar central portion includes a plurality of spaced-apart openings therethrough communicating with the respective inlet and outlet manifolds, said cross-over member flow channel inlet and outlet end portions communicating respectively with said openings.

17. A heat exchanger as claimed in claim 16 wherein said cross-over member flow channels define serpentine flow paths between respective inlet and outlet portions.

18. A method of forming a heat exchanger comprising the steps of: extruding a base member have a planar central portion and spaced-apart fins extending from one side of the planar central portion; forming a cross-over member having a plurality of spaced-apart transverse flow channels therein; forming a pair of spaced-apart flow manifolds in one of the base member and cross-over member; and attaching the cross-over member to the planar central portion, so that the flow manifolds and flow channels communicate with each other and the planar central portion.

19. A method as claimed in claim 18 wherein the cross-over member is formed by providing three stacked plates, a first plate having a plurality of spaced-apart, parallel slots formed therein; a second plate having a pair of spaced-apart slots formed therein and arranged transversely of the first plate slots; and a third plate covering the second plate and having inlet and outlet openings formed therein communicating with the second plate slots.

20. A method of forming a heat exchanger comprising the steps of: extruding a base member having a planar central portion and spaced-apart fins extending from one side of the planar central portion, the base member also having a pair of spaced-apart inlet and outlet manifolds extending transversely from the planar central portion in the same direction as the fins; forming a cross-over member having a plurality of spaced-apart flow channels formed therein, the flow channels having opposed inlet and outlet end portions; and attaching the cross-over member to the planar central portion, so that said opposed inlet and outlet end portions communicate with the respective inlet and outlet flow manifolds.

* * * * *